J. F. HAUSSMANN.
MOTOR CYCLE.
APPLICATION FILED AUG. 18, 1917.

1,302,656.

Patented May 6, 1919.
3 SHEETS—SHEET 1.

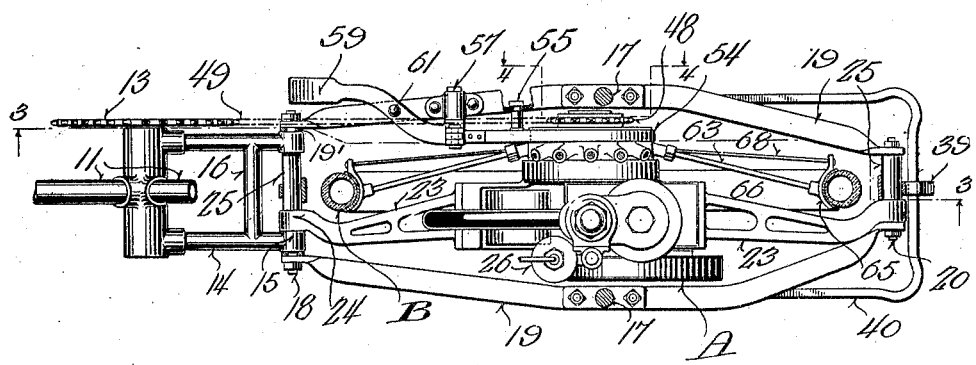
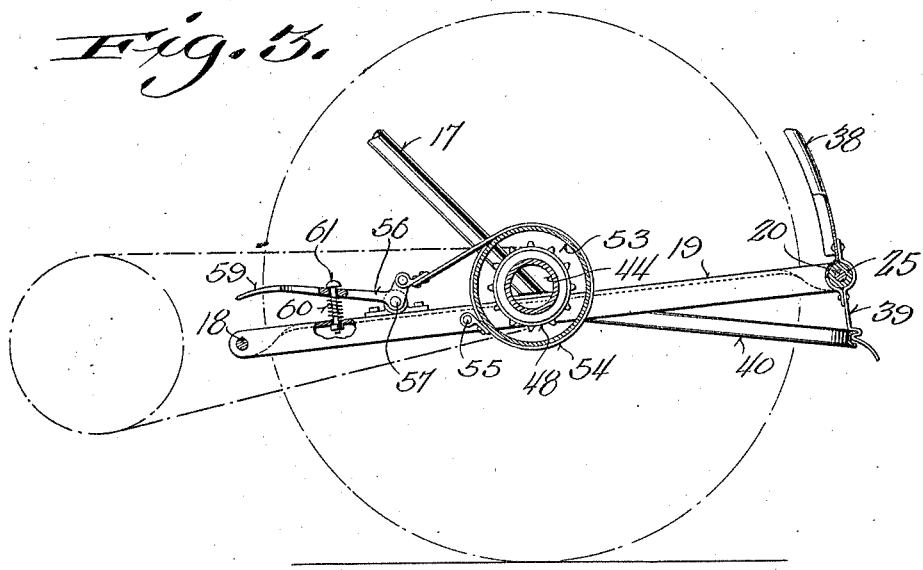
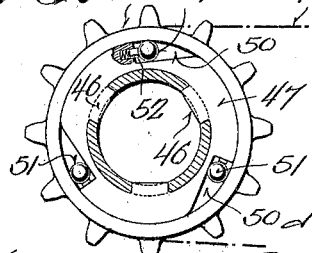

J. F. HAUSSMANN.
MOTOR CYCLE.
APPLICATION FILED AUG. 18, 1917.
1,302,656.
Patented May 6, 1919.
3 SHEETS—SHEET 3.
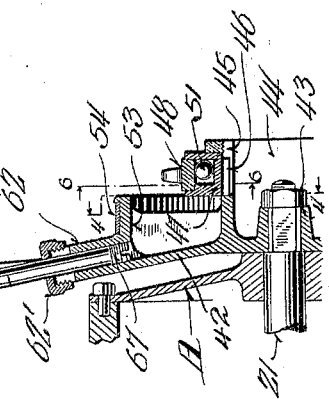
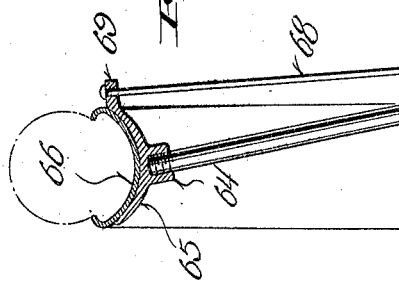
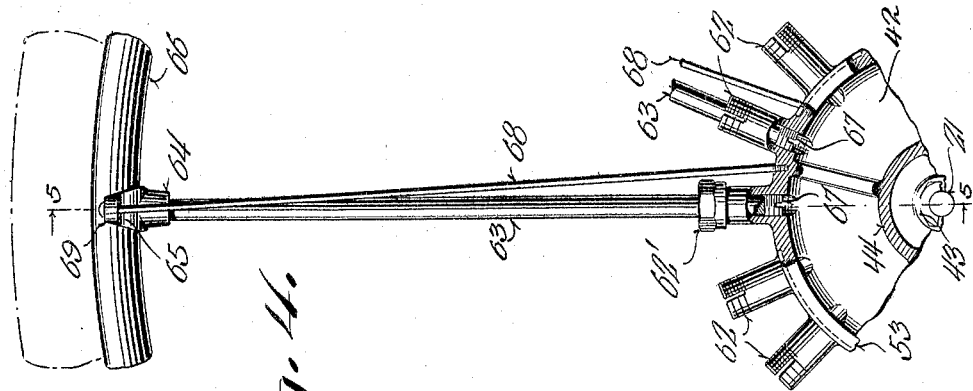

UNITED STATES PATENT OFFICE.

JOHN F. HAUSSMANN, OF MILWAUKEE, WISCONSIN, ASSIGNOR OF ONE-HALF TO BADGER PACKARD MACHINERY CO., OF MILWAUKEE, WISCONSIN.

MOTOR-CYCLE.

1,302,656.  Specification of Letters Patent.  Patented May 6, 1919.

Application filed August 18, 1917. Serial No. 186,994.

*To all whom it may concern:*

Be it known that I, JOHN F. HAUSSMANN, a citizen of the United States, and resident of Milwaukee, in the county of Milwaukee and State of Wisconsin, have invented certain new and useful Improvements in Motor-Cycles; and I do hereby declare that the following is a full, clear, and exact description thereof.

This invention relates to new and useful improvements in motorcycle structures, more particularly of a light type adapted to utilize a relatively small engine.

Various types of wheel carrying motor structures have been placed on the market for attachment to bicycles to provide motive power therefor, and it is primarily the object of the present invention to provide a bicycle frame adapted for association with standard types of wheel carrying motor attachments whereby the wheel of the motor attachment may serve as the rear wheel of the bicycle structure, to thus provide an exceedingly compact arrangement and to impart the weight of the rider to the driving wheel, whereby its gripping efficiency is increased.

A more specific object resides in the provision of a means for connecting the wheel carrying motor structure and the bicycle frame at normal points of attachment of the motor structure, whereby a proper balance and distribution of strain of the motorcycle structure is retained.

A still further object resides in the provision of a clutch controlled connection between the pedal crank shaft of the bicycle frame and the motor carried wheel whereby said wheel may be utilized for manual propulsion of the bicycle, and further whereby the engine may be readily cranked as in conventional motorcycle structures.

A still further object resides in the provision of exceedingly simple brake means for the motor carried wheel.

Motor carried wheels of the present nature are usually off-set inwardly of their attachment to their hubs, whereby the tire of the wheel may substantially coincide with the center of gravity of the motor structure, and more particularly in connection with this off-set arrangement of the wheel it is an object to provide an improved spoke construction therefor permitting a ready assembly and adjustment of the wheel structure.

With the above and other objects and advantages in view, the invention resides more particularly in the novel combination, formation and arrangement of parts hereinafter described and pointed out in the appended claims.

In the drawings:

Fig. 2 is a horizontal sectional view through the rear portion of the bicycle on the line 2—2 of Fig. 1.

Fig. 3 is a vertical sectional view on the line 3—3 of Fig. 2.

Fig. 4 is a vertical sectional view through a portion of the off-set wheel structure, the plane of this view with respect to the hub being shown by the line 4—4 of Fig. 5.

Fig. 5 is a vertical transverse sectional view through the wheel on the line 5—5 of Fig. 4.

Fig. 6 is a sectional view through the wheel on the line 6—6 of Fig. 5 showing the sprocket clutch.

Figure 1:
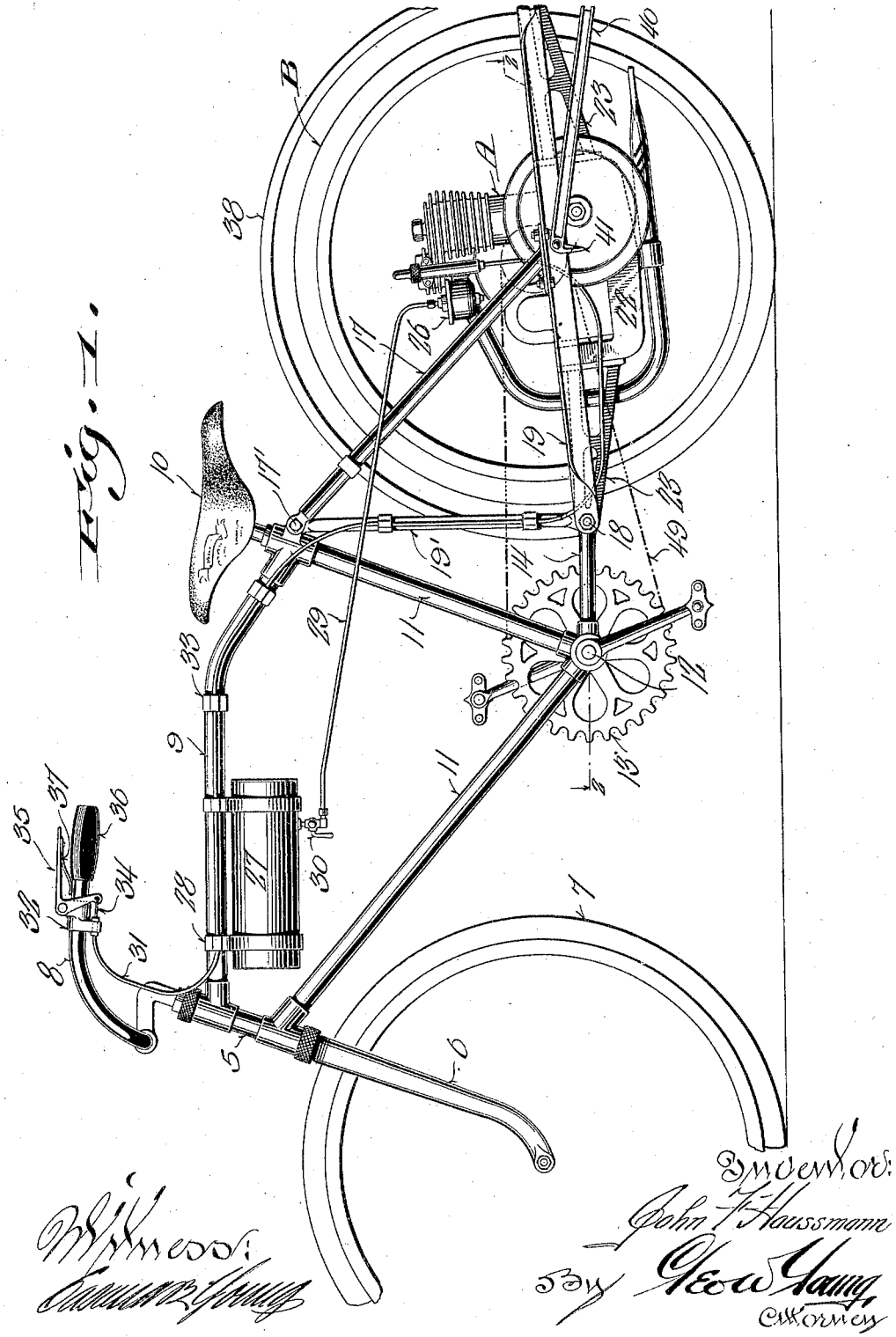
Figure 1 is a side elevational view of a bicycle having a wheel carrying motor structure associated therewith in accordance with the present invention.

Referring now more particularly to the accompanying drawings, there is provided a bicycle frame of general conventional design at its forward and intermediate portions and comprising a head post 5 carrying the front forks 6 in which is mounted the front wheel 7, and also carrying the handlebars 8. Extending from the upper portion of the post is the usual top bar 9 of the frame, having its rear portion inclined downwardly to form the clearance for a seat 10 and convergently extended from the rear of the top bar 9 and the lower portion of the head post 5 are bars 11 connected at their lower ends to form a bearing for a pedal crank shaft 12 carrying the usual sprocket wheel 13. Extending horizontally rearward from the pedal shaft bearings are a pair of bars 14 as in the usual bicycle structure, but instead of being extended to form lower rear forks, these bars terminate forwardly of the normal position of the rear wheel in bolt receiving eyes 15 and are connected adjacent their rear ends by a brace bar 16.

Extending rearwardly and downwardly from the juncture of the frame bars 9 and 11 is a pair of upper rear fork bars 17, these fork bars being spaced apart a relatively great distance. Secured on a bolt 18 disposed in the eyes 15 of the frame bars 14 are the forward ends of a pair of rearwardly extending outwardly bowed bars 19 preferably formed of angle iron and connected at their intermediate portions with the lower ends of the upper fork bar 17. The rear ends of the bars 19, which comprise substantially lower fork bars, are connected by a bolt 20. Thus the bars 17 and 19 inclose a space sufficient to house a wheel carrying motor structure of conventional type and more particularly of the type now in general use and known as the Smith motor wheel. The juncture of the bars 14 and 19 are preferably braced by links 19' mounted on outer portions of the bolt 18 and secured at the upper ends by the securing means of the upper fork bars 17 and to the frame, said securing means preferably comprising a bolt 17' passed therethrough and engaged with the frame. This structure comprises a motor A having a shaft 21 projecting therefrom and carrying a wheel B, the tire portion of which is inwardly offset to surround the motor. The motor is carried in a U shaped bed block 22 from the end portions of which extend a pair of arms 23 inclined laterally to clear the tire portion of the wheel and having their outer extremities inwardly offset and provided with attaching eyes 24, these attaching eyes being normally intended for the securement of suitable means for attaching the wheel carrying motor structure to a bicycle at its side.

In associating this wheel carrying motor structure with my improved frame construction, I mount the eyes 24 of the arms on the bolts 18 and 20 of the lower fork bars 19, the arms being held against lateral movement by spacing sleeves 25 on said bolts. Thus the motor structure is mounted in a manner for which it is particularly designed vithout sacrificing any of the features of balance and proper distribution of strain incidental to such mounting. The propelling wheel of the motor structure is utilized as the rear supporting wheel of the bicycle which is thus transformed into a motor cycle of exceedingly light and compact nature. Although it is by my construction possible to adapt ordinary bicycle frames for association with a wheel carrying motor in the present manner by supplying rear fork portions constructed as described, it will be found advisable to construct entire frames in the manner described for use with conventional wheel carrying motor structures and such frames would be preferably of somewhat heavier material than the usual bicycle frames.

For supplying fuel to the carbureter 26 of the engine, a tank 27 is suspended by straps 28 from the forward portion of the bicycle frame bar 9 and a pipe 29 extends from this tank to the carbureter being provided immediately adjacent the tank with a shut off valve 30. For controlling the carbureter, a flexible casing 31 is secured to a sleeve 32 fixed on one of the handle-bars 8 and this casing extends along the top bar 9 and one of the brace links 19' to the carbureter being secured to the bar by suitable clip members 33. Mounted in the casing is a flexible rod 34 connected with the carbureter in a conventional manner (not shown) and extending outwardly from the handle-bar end of the casing 31 for attachment to a handle grip lever 35 pivoted to the sleeve 32 and including a portion extending longitudinally of and adjacent the grip 36 of the handle-bar and normally urged therefrom by a spring 37.

Between its attachments to the bar 9 and to the sleeve 32, the flexible casing 31 is sufficiently loose to permit steering movements of the handle-bar. A mud shield for the wheel B is provided which comprises an arcuate plate 38 disposed about the upper portion of the wheel and secured at its forward end to the spacing sleeve 25 of the bolt 18 and at its rear end to the spacing sleeve of the bolt 20, a spring catch finger 39 being also secured to the spacing sleeve of the bolt 20 and adapted to engage the bight of a U shaped stand member 40 having its legs pivoted to the intermediate portions of the bars 19 and provided with stop fingers 41 adapted to abut said bars.

The wheel B of the present structure comprises a hub plate 42 which is provided centrally with an attaching sleeve 43 fixed on the shaft 21 of the motor and provided with an outstanding annular flange 44 provided in its outer portion with transverse open end slots 45 in which are engaged lugs 46 on the inner periphery of an annular clutch block 47. Journaled on this block is a sprocket rim 48 connected with the sprocket 13 of the pedal crank shaft by a chain 49. The block is provided in its periphery with angular recesses 50 in which are disposed clutch balls 51 normally urged to binding relation with the sprocket rim and block by spring urged plungers 52 slidable in certain walls of the recesses 50. Thus upon propulsion of the wheel by the engine the sprocket rim will be free with respect to the hub and will clutchingly engage the hub for rotative movement thereof by the pedal shaft.

Outwardly of the flange 44 the hub plate is provided with a second outwardly projecting annular flange 53 which affords a friction face for a band brake 54 disposed thereabout and secured at one end to a forwardly disposed pin 55 carried by the adjacent fork bar 19. The other end of the brake band is secured to the up-standing arm of an angle lever 56 journaled on a stub shaft 57 carried by the fork bar 19. The other arm of this lever is relatively long and extends horizontally, the free end of said arm being offset outwardly to clear the sprocket chain 49 and terminating in a foot piece 59. The band brake is normally held in releasing position by an expansile spring 60 disposed on a bolt 61 loosely passed through the long arm of the lever and through the fork bar 19.

The peripheral portion of the plate is provided with a series of radially projecting sleeves 62 in which are disposed the inner ends of spoke rods 63 which have their outer ends threadedly engaged in threaded bosses 64 of transverse saddle plates 65 which carry the tire rim 66. The bores of the sleeves 62 extend through the flange 53 and threaded in the inner ends of the bores for abutting engagement with the spoke rods are plugs 67. Thus by screwing the plugs into the bores, the spokes may be adjusted outwardly. To bind the spokes positively in desired adjusted positions; the outer ends of the sleeve 62 are split and threaded on said split outer ends are clamping nuts 62'. It is noted that the spoke rods 63 are inclined laterally of the hub, whereby the tire carrying rim 66 is off-set inwardly with respect to the motor structure to procure a proper balance thereof, this being the general arrangement of such wheels. To provide additional holding means for the rim, wire spokes 68 are passed through lugs 69 out-standing at the ends of the saddle plates adjacent the hub, and the lower ends of these wire spokes are threadedly engaged in the hub plate.

While I have shown and described one preferred form of my invention, it will be appreciated that under differing conditions of use and to meet differing desired adaptations, various changes or modifications may be resorted to without departing from the spirit of the invention as interpreted by the appended claims.

It is noted that the spokes 63 are adjusted by exerting an outward pushing tendency on the tire rim, while the spokes 68 are adjusted by exerting a pulling tendency thereon, and by this arrangement, a most ready truing of the wheel may be procured.

By disposing the motor carrying wheel structure within the rear fork bars of the cycle frame, a further advantageous feature is that the upper and lower fork bars serve as an efficient shield for the motor structure to prevent possible breakage thereof upon over-turning the motor cycle.

What is claimed is:

1. The combination with a wheel carrying motor structure having arms projecting therefrom and extending outwardly of the wheel, of a cycle frame, and means carried by the frame for attachment to the arms of the motor structure whereby the wheel thereof supports the rear portion of the frame.

2. The combination with a wheel carrying motor structure having arms projecting therefrom and extending outwardly of the wheel, of a cycle frame, a wheel at the front of the frame, a pair of spaced bars carried at the rear of the frame and adapted to receive the wheel carrying motor structure there-between and means for attaching the ends of the arms of said motor structure to said bars.

3. The combination with a wheel carrying motor structure having arms projecting therefrom and extending outwardly of the wheel, of a cycle frame, a wheel at the front of the frame, rear fork bars extending rearwardly and downwardly from the frame, spaced bars having their intermediate portions secured to said rear fork bars and adapted to receive the wheel carrying motor structure therebetween, and means for securing the ends of the arms of the motor structure to the ends of said spaced bars.

4. The combination with a wheel carrying motor structure having arms projecting therefrom and extending outwardly of the wheel, of a cycle frame, a wheel at the front of the frame, upper and lower rear pairs of forks extending from the frame and adapted to embrace said wheel carrying motor structure, the upper pair of forks being secured to the intermediate portions of the lower pair of forks and means for securing the ends of the arms of said motor structure to the end portions of the lower pairs of forks.

5. The combination with a wheel carrying motor structure having arms projecting therefrom and extending outwardly of the wheel, of a cycle frame, a wheel at the front of the frame, means carried by the frame for attachment to the arms of the motor structure whereby the wheel thereof supports the rear portion of the frame, a pedal shaft carried by the frame and a chain connected between said shaft and the wheel of the motor structure.

6. The combination with a cycle frame, of a wheel carrying motor structure, a brake drum on the wheel of said motor structure, a pair of fork bars extending rearwardly from said frame, one of said bars being disposed adjacent said brake drum, means for connecting the motor structure with said bars, a lever pivoted to one of said bars, and a brake band disposed around said brake drum and having one end secured to said lever, the other end being connected to one of said bars.

In testimony that I claim the foregoing I have hereunto set my hand at Milwaukee, in the county of Milwaukee and State of Wisconsin, in the presence of two witnesses.

JOHN F. HAUSSMANN.

Witnesses:
FRANK S. RATCLIFFE,
M. E. DOWNEY.

Copies of this patent may be obtained for five cents each, by addressing the "Commissioner of Patents, Washington, D. C."